United States Patent [19]
Collette et al.

[11] Patent Number: 5,160,059
[45] Date of Patent: Nov. 3, 1992

[54] REINFORCED CONTAINER BASE AND METHOD OF FORMING SAME

[75] Inventors: Wayne N. Collette, Merrimack; Bryan H. Miller; Suppayan M. Krishnakumar, both of Nashua; Thomas E. Nahill, Amherst, all of N.H.

[73] Assignee: Continental PET Technologies, Inc., Florence, Ky.

[21] Appl. No.: 33,356

[22] Filed: Apr. 2, 1987

[51] Int. Cl.⁵ ................... B65D 23/00; B29C 45/03; B29C 49/06
[52] U.S. Cl. .................................. 215/1 C; 264/523; 428/542.8
[58] Field of Search ................. 215/1 C; 264/523; 220/70; 428/35, 542.8

[56] References Cited

U.S. PATENT DOCUMENTS

| | | | |
|---|---|---|---|
| 3,598,270 | 8/1971 | Adomaitis et al. | 215/1 C |
| 3,881,621 | 5/1975 | Adomaitis | 215/1 C |
| 4,108,324 | 8/1978 | Krishnakumar et al. | 215/1 C |
| 4,525,401 | 6/1985 | Pocock et al. | 215/1 C |
| 4,603,831 | 8/1986 | Krishnakumar et al. | 215/1 C |

FOREIGN PATENT DOCUMENTS

| | | | |
|---|---|---|---|
| 1153324 | 9/1983 | Canada | 215/1 C |
| 140792 | 5/1985 | European Pat. Off. | 215/1 C |

*Primary Examiner*—William I. Price
*Attorney, Agent, or Firm*—Wolf, Greenfield & Sacks

[57] ABSTRACT

The reinforcement of a blow molded base of the type including a generally hemispherical configuration interrupted at circumferentially spaced intervals by protruding legs. Prior cracking problems at the intersection of the foot-radii of such legs with the generally hemispherical portion are solved by an internal reinforcement of the base in that area. The reinforcement may be either localized with the points of reinforcement being circumferentially spaced and in alignment with the legs, or may be in the form of a continuous band. The reinforcement is effected by providing a preform from which a container employing such base is blow molded and wherein the preform is provided either with internal ribs or an internal band of reinforcement and the resultant containers are blow molded in the same mold as previously utilized.

8 Claims, 2 Drawing Sheets

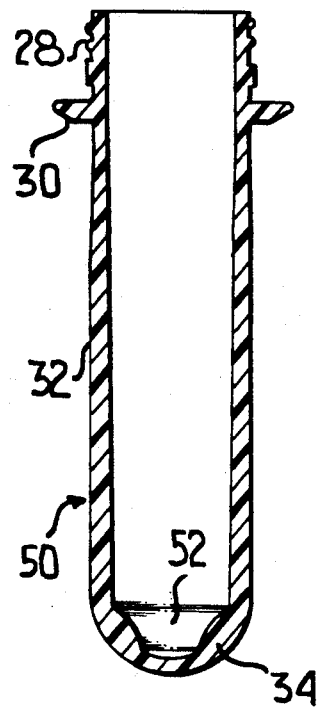
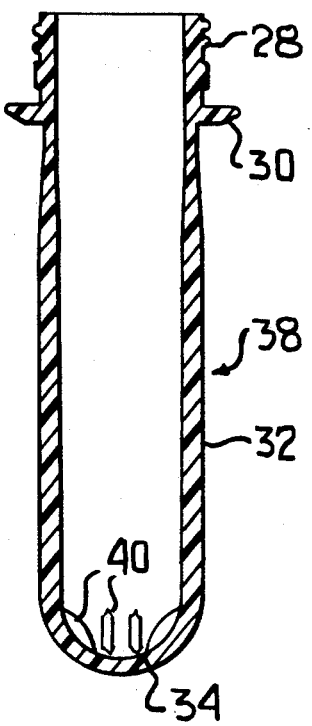
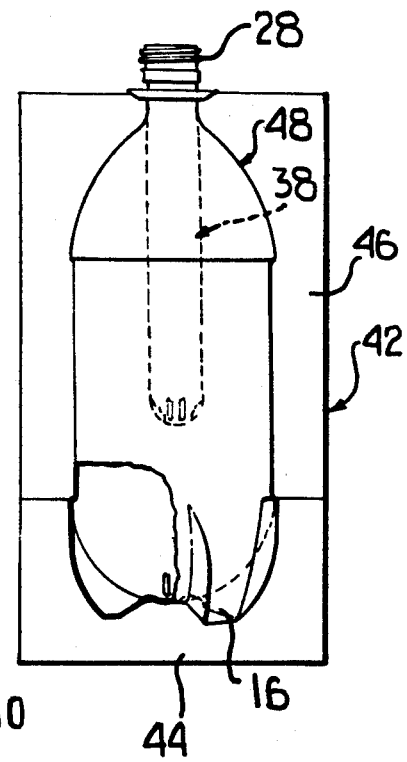
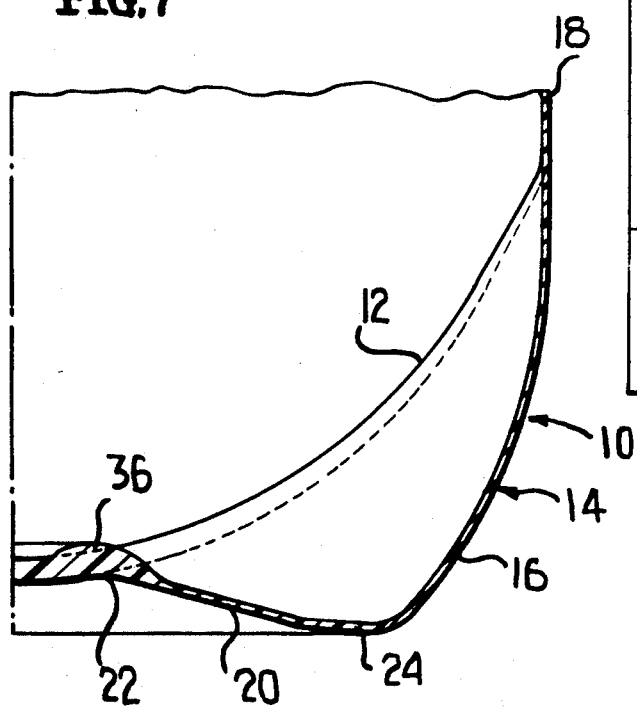

REINFORCED CONTAINER BASE AND METHOD OF FORMING SAME

This invention relates to the improvement by reinforcement of a base of a blow molded free standing plastic container.

There has been developed and utilized for a period of time blow molded plastic containers wherein the base of such containers is of a generally hemispherical upwardly opening configuration interrupted by a series of radially extending circumferentially spaced hollow legs. Each of the legs has a lowermost foot which slopes axially upwardly and radially inwardly and is joined to a central portion of the generally hemispherical configuration by a downwardly opening radius. When these containers have been utilized as bottles for carbonated beverages wherein there are high internal pressures, such container bases are subject to environmental stress crack initiation and occasional leakage failure when exposed to high temperatures and high humidity environments in the presence of stress crack agents. The crack failures occur at the high stress tension point where the base hemisphere meets the foot leg radius.

Attempts have been made to overcome these deficiencies by making geometric changes in the base configuration. However, these geometric changes have not resolved the summer leakage problem.

In accordance with this invention, the bending moments which exist in the area of maximum crack initiation can be reduced by selectively increasing material thickness. This is accomplished at a minimum additional manufacturing cost by providing preforms which are especially internally reinforced so that when the preforms are blow molded in a customary blow mold for such containers, the wall thickness of the foot leg radius is increased.

With the above and other objects in view that will hereinafter appear, the nature of the invention will be more clearly understood by reference to the following detailed description, the appended claims, and the several views illustrated in the accompanying drawings.

FIG. 5 is a vertical sectional view taken through one form of reinforced preform utilized for reinforcing the container base in accordance with the invention.

FIG. 6 is another vertical sectional view taken through a reinforced different preform.

FIG. 7 is an enlarged fragmentary vertical sectional view similar to FIG. 2 but showing the improved reinforced base.

FIG. 8 is a schematic sectional view showing the manner in which a bottle having a reinforced base is blow molded utilizing the preform of FIG. 6 to form the reinforced base of FIG. 7.

Figure 1:
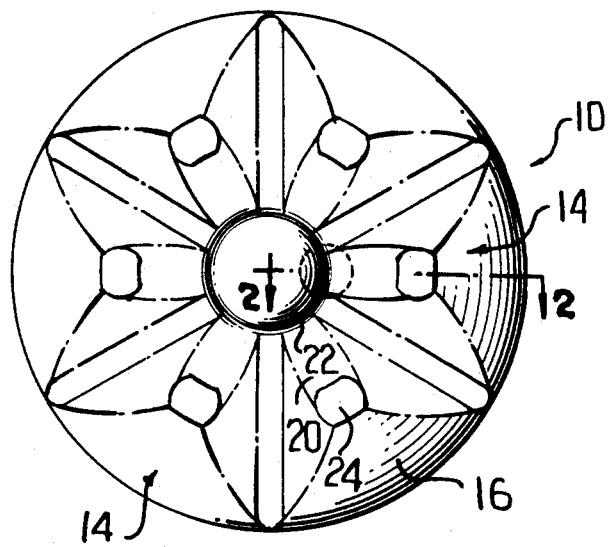
FIG. 1 is a bottom plan view of a container base as existed prior to this invention.
Figure 3:
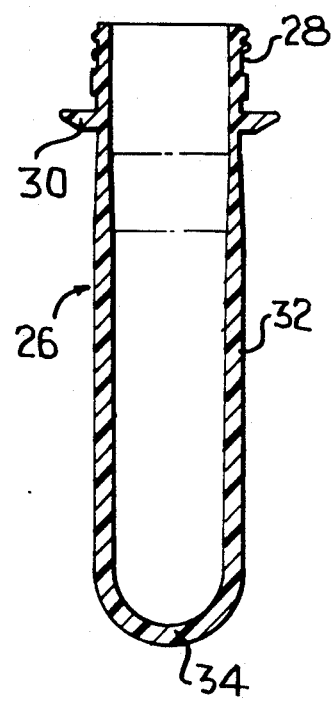
FIG. 3 is a vertical sectional view taken through a prior art preform utilized to form a bottle having a base according to FIGS. 1 and 2.
Figure 2:
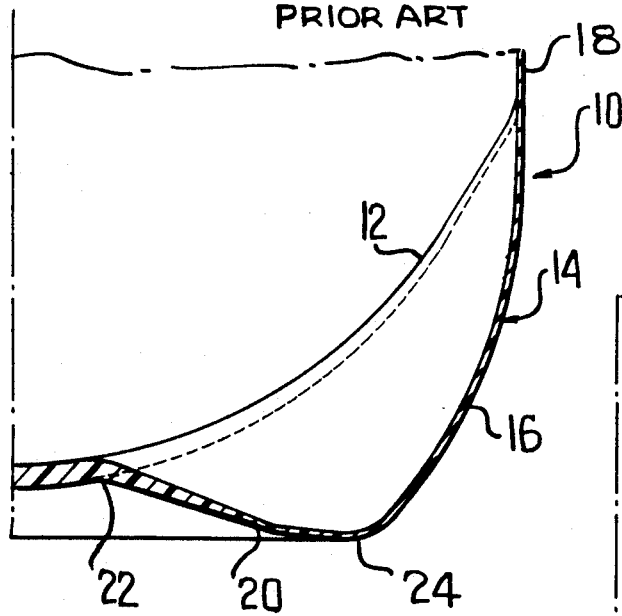
FIG. 2 is an enlarged fragmentary vertical sectional view taken generally along the line 2—2 of FIG. 1 and shows specifically the configuration of the container base.

Reference is first made to the prior art showing of FIGS. 1 and 2 wherein there is illustrated the base 10 of a hollow member, such as a container, and more specifically a bottle. The base 10 is of a blow molded construction and is formed of a suitable plastic material including, but not limited to, PET. The base 10, as is best shown in FIG. 2, includes a generally hemispherical upwardly opening configuration 12 interrupted by a series of radially extending, circumferentially spaced, hollow legs 14. Each leg 14 opens into the interior of the base 10 and includes an outer wall portion 16 which is joined to the generally hemispherical configuration 12 in an area where the base 10 joins a generally cylindrical part 18 of the hollow member. Each leg 14 also includes a lower foot 20 which slopes axially upwardly or inwardly and radially inwardly and is joined to the generally hemispherical outline 12 by way of a radius 22. The foot 20 may have a flattened area 24 for seating on a support.

The hollow article, when it is in the form of a bottle, is blow molded in a blow mold having a bottom configuration for defining the base 10 utilizing a preform generally identified by the numeral 26. The preform 26 is of a conventional construction and includes an injection molded upper neck finish 28 below which the preform is provided with a supporting flange 30. The preform 26 has a slightly tapered tubular body 32 which terminates in a substantially hemispherical bottom 34.

Figure 4:
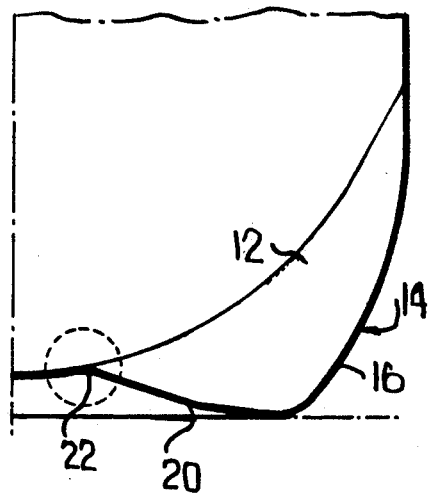
FIG. 4 is a schematic elevational view directed specifically to the portion of the prior art container base wherein crack failure has been experienced.

As discussed above, with reference to FIG. 4, the base 10 has a high stress tension point where the base hemisphere 12 meets the radius 22. Not withstanding geometric changes in the base configuration, crack failure still occurs at this high tension point when the hollow member of which the base is a part is exposed to high temperature and high humidity environments in the presence of stress crack agents. This invention relates to the solving of the crack and resultant leakage problem by reinforcing the base 10 at the point of crack initiation.

Referring now to FIG. 7, it will be seen that in accordance with this invention, the base 10 is reinforced by the addition of material internally of the base as at 36. The added material which provides the reinforcement 36 in part increases the thickness of the generally hemispherical portion 12 and in part increases the thickness of the foot 20 at its intersection with the hemispherical part 12. The net result is that the base 10, in the area of the radius 22, is increased in thickness so as to eliminate the previously experienced crack failure.

It is to be noted that the reinforcement 36 has, in cross section, a convex radial cross section.

For economical purposes, it is preferred that there be a separate reinforcement 36 for each of the legs 14. This may be accomplished by utilizing a preform such as the preform 38 shown in FIG. 6. The preform 38 is identical with the preform 26 except that the bottom 34 is provided with internal reinforcing ribs 40. The number of the ribs 40 corresponds to the number and orientation of the legs 14. Each rib 40 has upper and lower ends terminating within the generally hemispherical bottom 34 and is of an inwardly convex cross section.

A bottle containing the reinforced base of FIG. 7 is formed from the preform 38 in a blow mold 42 which is a conventional blow mold for forming a bottle having the base construction of FIGS. 1 and 2. Such a blow mold is of a three part construction including a base member 44 and two upper portions 46. As is customary, the preform 38 is mounted within the upper part of the blow mold 52 and is axially elongated and increased in diameter to match the internal configuration of the blow mold 42 utilizing gaseous pressure. If desired, the preform 38 may be mechanically axially elongated prior to the introduction of a blowing gas or during such introduction.

It is to be understood that the resultant hollow article in the form of a biaxially oriented blow molded bottle 48 will have an external configuration corresponding to that of the interior of the blow mold 42 with the exterior of the base of such bottle being identical with the previously formed base utilizing such a blow mold 42.

It is to be understood at this time that since the preform 38 has one rib 40 for each of the legs 14, it is necessary to rotationally or circumferentially orient the preform 38 with the configuration of the base 44 of the blow mold 42.

It will be appreciated that it is preferred not to have the required orientation of the preform with the blow mold. Accordingly, one may utilize the preform of FIG. 5, which preform is generally identified by the numeral 50. The preform 50 corresponds to the preforms 26 and 38 except that in lieu of either being free of reinforcement or being provided with ribs, the substantially hemispherical bottom 34 is reinforced by an internal reinforcement 52 in the form of a band of internally increased thickness. This band, which is annular, is identified by the numeral 52 and has its upper and lower limits within the substantially hemispherical bottom 34 as is clearly illustrated.

The band 52 of reinforcement, like the reinforcing ribs 40, is of an increased central thickness so as to present in cross section an inwardly convex configuration.

It is to be understood that when the bottle 48 is formed in the blow mold 42 utilizing the preform 50, in lieu of the reinforcement 36 of FIG. 7 being circumferentially spaced and only aligned with the radii 22, the reinforcement will be in the form of a continuous band of added thickness having the same cross section as the reinforcement 36.

Returning to the preform 38, preforms of similar configurations are known for use in the blow molding of containers with champagne type bases wherein the ribs resist axial elongation of the bottom of the preform during the initial axial elongation of the preform so as to maintain more material in the champagne bottle type base. Further, the resultant base has narrow internal reinforcing ribs which are in no way oriented with legs nor do the ribs per se in any way solve a cracking problem of the type to which this invention relates.

Although only several ways of reinforcing the known base have been specifically illustrated and described herein, it is to be understood that minor variations may be made in the reinforcement of the base without departing from the spirit and scope of the invention as defined by the appended claims.

We claim:

1. A base of a hollow member, said base being of a blow molded plastic material construction and comprising a generally hemispherical upwardly opening configuration interrupted by a series of radially extending circumferentially spaced hollow legs, each of said legs having a lowermost foot sloping axially upwardly and radially inwardly and joined to a central portion of said generally hemispherical configuration by a downwardly opening radius, said hollow member base being improved by a localized thickening of said base, said thickening of said base being substantially restricted to a band-like area of said base including each radius.

2. A base according to claim 1 wherein said thickening of said base is in circumferentially spaced areas only and said areas are aligned with said feet.

3. A base according to claim 1 wherein said thickening of said base is continuous in said band-like area.

4. A base according to claim 2 wherein said band-like area is of a width corresponding to the radial extent of said radius.

5. A method of forming a plastic hollow member having a base which has a generally hemispherical upwardly opening configuration interrupted by a series of radially extending circumferentially spaced hollow legs with each of the legs having a lowermost foot sloping axially upwardly and radially inwardly and joined to a central portion of the generally hemispherical configuration by a downwardly opening radius, and the base is reinforced in the area of each radius, said method comprising the steps of utilizing a conventional blow mold having a configuration defining the exterior configuration of the hollow member base, providing a plastic preform having a tubular body and a substantially hemispherical bottom with the preform bottom having an internal reinforcement, placing the preform in the blow mold, and blowing the preform within the blow mold to form a blow molded hollow member having a base of a configuration conforming to the configuration of the base and wherein the internal reinforcement of the preform results in the thickening of the blow molded base at each radius.

6. A method in accordance with claim 5 wherein the internal reinforcement of the preform is in the form of axially extending circumferentially spaced ribs of a number corresponding to the number of the legs of the hollow member base, and the preform is oriented in the mold with the preform ribs being aligned with those portions of the mold defining the base legs prior to the blowing of the preform.

7. A method in accordance with claim 5 wherein the internal reinforcement of the preform is in the form of an internal annular thickening so as to eliminate any necessity of circumferentially orienting the preform relative to the blow mold, and the thickening of the blow molded base is in the form of a continuous annular band which includes each radius.

8. A method in accordance with claim 7 wherein the preform internal annular thickening is formed to have a radially inwardly projecting convex shape in cross section.

* * * * *